(12) United States Patent
Smith et al.

(10) Patent No.: US 7,535,441 B2
(45) Date of Patent: May 19, 2009

(54) DISPLAY DRIVER CIRCUITS

(75) Inventors: Euan C. Smith, Cambridge (GB); Paul R. Routley, Cambridge (GB)

(73) Assignee: Cambridge Display Technology Limited, Cambridgeshire (GB)

( * ) Notice: Subject to any disclaimer, the term of this patent is extended or adjusted under 35 U.S.C. 154(b) by 223 days.

(21) Appl. No.: 10/507,817

(22) PCT Filed: Mar. 14, 2003

(86) PCT No.: PCT/GB03/01100

§ 371 (c)(1),
(2), (4) Date: Feb. 22, 2005

(87) PCT Pub. No.: WO03/079322

PCT Pub. Date: Sep. 25, 2003

(65) Prior Publication Data

US 2005/0140610 A1   Jun. 30, 2005

(30) Foreign Application Priority Data

Mar. 14, 2002  (GB) ................................. 0206062.2

(51) Int. Cl.
*G09G 3/30* (2006.01)
(52) U.S. Cl. ............................... 345/76; 345/77; 345/82
(58) Field of Classification Search ............. 345/76–82, 345/36, 45, 690; 315/169
See application file for complete search history.

(56) References Cited

U.S. PATENT DOCUMENTS

| 4,102,347 | A | * | 7/1978 | Yukl | ........................... 607/46 |
|---|---|---|---|---|---|
| 4,539,507 | A | | 9/1985 | VanSlyke et al. | ............. 313/504 |
| 4,855,618 | A | * | 8/1989 | Brokaw | ....................... 327/542 |
| 4,996,523 | A | * | 2/1991 | Bell et al. | ....................... 345/77 |
| 5,594,463 | A | * | 1/1997 | Sakamoto | ..................... 345/76 |
| 5,966,110 | A | * | 10/1999 | Van Zalinge | ................. 345/82 |
| 6,014,119 | A | | 1/2000 | Staring et al. | .................. 345/82 |
| 6,055,180 | A | * | 4/2000 | Gudesen et al. | ............. 365/175 |

(Continued)

FOREIGN PATENT DOCUMENTS

EP         1 039 440 A1     9/2000

(Continued)

OTHER PUBLICATIONS

International Search Report in PCT/GB03/01100 dated Jun. 25, 2003.

*Primary Examiner*—Regina Liang
*Assistant Examiner*—Christopher E Leiby
(74) *Attorney, Agent, or Firm*—Marshall, Gernstein & Borun LLP

(57) ABSTRACT

Display driver circuits are described for driving organic light emitting diode displays, particularly passive matrix displays, with greater efficiency. The display drivers comprise a controllable current generator to provide a variable current drive output to an OLED display, the current generator comprising at least one bipolar transistor in series with the current drive output. The display brightness is adjustable by controlling the current generator to vary the current drive to the display. Preferably the bipolar transistor has an emitter terminal substantially directly connected to a power supply line of the driver to reduce losses in the driver. A corresponding method is also described. By employing a bipolar transistor current drive and varying display brightness by controlling the current an efficient driver-display combination is obtained.

30 Claims, 5 Drawing Sheets

U.S. PATENT DOCUMENTS

| | | | |
|---|---|---|---|
| 6,140,878 A * | 10/2000 | Masuta | 330/308 |
| 6,201,520 B1 * | 3/2001 | Iketsu et al. | 345/76 |
| 6,310,589 B1 * | 10/2001 | Nishigaki et al. | 345/76 |
| 6,332,661 B1 | 12/2001 | Yamaguchi | 317/108 |
| 6,628,252 B2 * | 9/2003 | Hoshino et al. | 345/82 |
| 6,690,117 B2 * | 2/2004 | Komiya | 315/169.3 |
| 2005/0073486 A1 * | 4/2005 | Maede et al. | 345/76 |
| 2005/0231448 A1 * | 10/2005 | Tanabe et al. | 345/76 |
| 2005/0237284 A1 * | 10/2005 | Yaguma et al. | 345/76 |

FOREIGN PATENT DOCUMENTS

| | | |
|---|---|---|
| EP | 1 079 361 A1 | 2/2001 |
| EP | 1 091 339 A2 | 4/2001 |
| EP | 1 091 339 A3 | 4/2001 |
| WO | WO 90/13148 | 11/1990 |
| WO | WO 95/06400 | 3/1995 |
| WO | WO 99/48160 | 9/1999 |

* cited by examiner

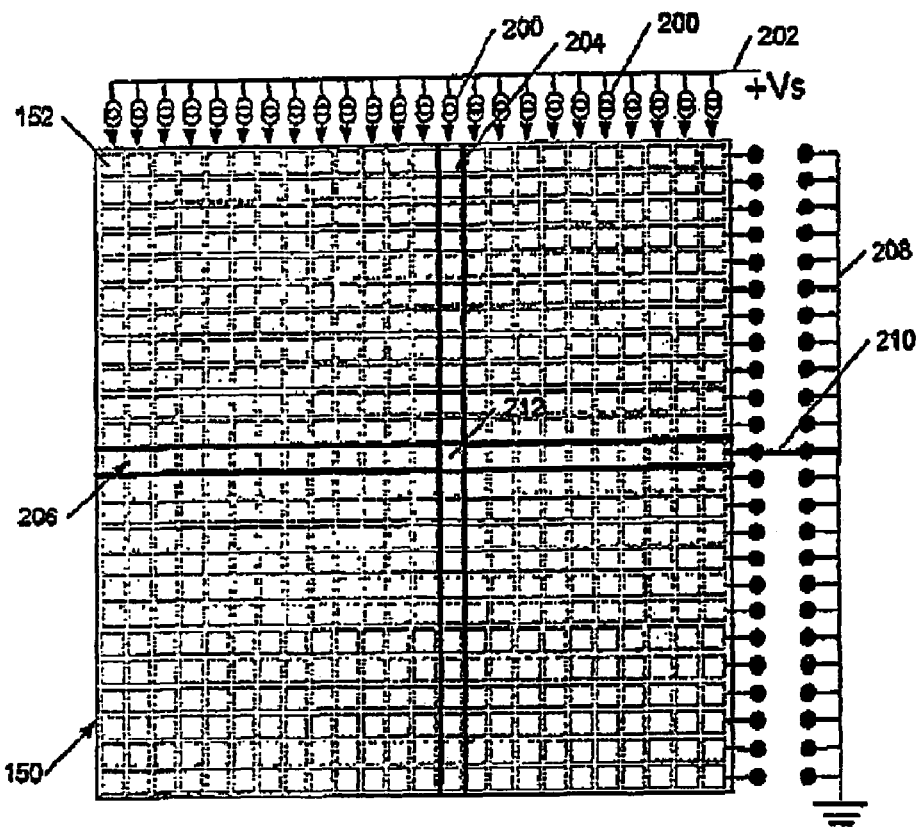
Figure 2a
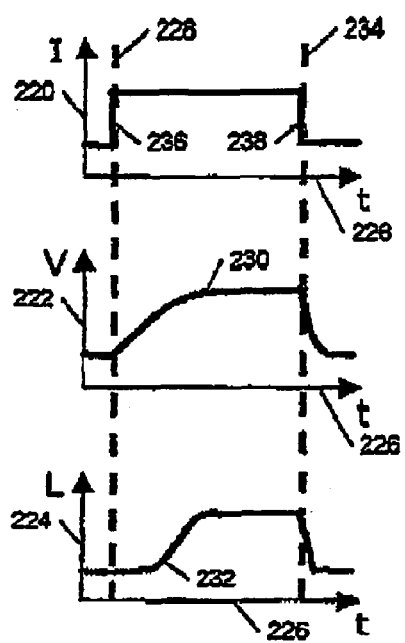
Figure 2b
Figure 2c
Figure 2d

DISPLAY DRIVER CIRCUITS

This is the U.S. national phase of International Application No. PCT/GB03/01100 filed Mar. 14, 2003, the entire disclosure of which is incorporated herein by reference.

BACKGROUND OF THE DISCLOSURE

1. Field of the Disclosure

This disclosure relates to display driver circuits for electro-optic displays, and more particularly relates to circuits and methods for driving organic light emitting diode displays, especially passive matrix displays, with greater efficiency.

2. Related Technology

Organic light emitting diodes (OLEDs) comprise a particularly advantageous form of electro-optic display. They are bright, colourful, fast-switching, provide a wide viewing angle and are easy and cheap to fabricate on a variety of substrates. Organic LEDs may be fabricated using either polymers or small molecules in a range of colours (or in multi-coloured displays), depending upon the materials used. Examples of polymer-based organic LEDs are described in WO 90/13148, WO 95/06400 and WO 99/48160; examples of so called small molecule based devices are described in U.S. Pat. No. 4,539,507.

A basic structure 100 of a typical organic LED is shown in FIG. 1a. A glass or plastic substrate 102 supports a transparent anode layer 104 comprising, for example, indium tin oxide (ITO) on which is deposited a hole transport layer 106, an electroluminescent layer 108, and a cathode 110. The electroluminescent layer 108 may comprise, for example, a PPV (poly(p-phenylenevinylene)) and the hole transport layer 106, which helps match the hole energy levels of the anode layer 104 and electroluminescent layer 108, may comprise, for example, PEDOT:PSS (polystyrene-sulphonate-doped polyethylene-dioxythiophene). Cathode layer 110 typically comprises a low work function metal such as calcium and may include an additional layer immediately adjacent electroluminescent layer 108, such as a layer of aluminum, for improved electron energy level matching. Contact wires 114 and 116 to the anode the cathode respectively provide a connection to a power source 118. The same basic structure may also be employed for small molecule devices.

In the example shown in FIG. 1a light 120 is emitted through transparent anode 104 and substrate 102 and such devices 3 referred to as "bottom emitter". Devices which emit through the cathode may also be constructed, for example by keeping the thickness of cathode layer 110 less than around 50-100 nm so that the cathode is substantially transparent.

Organic LEDs may be deposited on a substrate in a matrix of pixels to form a single or multi-colour pixellated display. A multicoloured display may be constructed using groups of red, green and blue emitting pixels. In such displays the individual elements are generally addressed by activating row (or column) lines to select the pixels, and rows (or columns) of pixels are written to, to create a display. So-called active matrix displays have a memory element, typically a storage capacitor and a transistor, associated with each pixel whilst passive matrix displays have no such memory element and instead are repetitively scanned, somewhat similarly to a TV picture, to give the impression of a steady image.

FIG. 1b shows a cross section trough a passive matrix OLED display 150 in which like elements to those of FIG. 1a are indicated by like reference numerals. In the passive matrix display 150 the electroluminescent layer 108 comprises a plurality of pixels 152 and the cathode layer 110 comprises a plurality of mutually electrically insulated conductive lines 154, running into the page in FIG. 1b, each with an associated contact 156. Likewise the ITO anode layer 104 also comprises a plurality of anode lies 158, of which only one is shown in FIG. 1b, running at right angles to the cathode lies. Contacts (not shown in FIG. 1b) are also provided for each anode line. An electroluminescent pixel 152 at the intersection of a cathode line and anode line may be addressed by applying a voltage between the relevant anode and cathode lines.

Referring now to FIG. 2a, this shows, conceptually, a driving arrangement for a passive matrix OLED display 150 of the type shown in FIG. 1b. A plurality of constant current generators 200 are provided, each connected to a supply line 202 and to one of a plurality of column lines 204, of which for clarity only one is shown. A plurality of row lines 206 (of which only one is shown) is also provided and each of these may be selectively connected to a ground line 208 by a switched connection 210. As shown, with a positive supply voltage on line 202, column lines 204 comprise anode connections 158 and row lines 206 comprise cathode connections 154, although the connections would be reversed if the power supply line 202 was negative and with respect to ground line 208.

As illustrated pixel 212 of the display has power applied to it and is therefore illuminated. To create an image connection 210 for a row is maintained as each of the column lines is activated in turn until the complete row has been addressed, and then the next row is selected and the process repeated. Alternately a row may be selected and all the columns written in parallel, that is a row selected and a current driven onto each of the column lines simultaneously, to simultaneously illuminate each pixel in a row at its desired brightness. Although this latter arrangement requires more column drive circuitry it is preferred because it allows a more rapid refresh of each pixel. In a further alternative arrangement each pixel in a column may be addressed in turn before the next column is addressed, although this is not preferred because of the effect, inter alia, of column capacitance as discussed below. It will be appreciated that in the arrangement of FIG. 2a the functions of the column driver circuitry and row driver circuitry may be exchanged.

It is usual to provide a current-controlled rather than a voltage-controlled drive to an OLED because the brightness of an OLED is determined by the current flowing through it, this determining the number of photons it outputs. In a voltage-controlled configuration the brightness can vary across the area of a display and with time, temperature, and age, making it difficult to predict how bright a pixel will appear when driven by a given voltage. In a colour display the accuracy of colour representations may also be affected.

FIGS. 2b to 2d illustrate, respectively, the current drive 220 applied to a pixel, the voltage 222 across the pixel, and the light output 224 from the pixel over time 226 as the pixel is addressed. The row coining the pixel is addressed and at the time indicated by dashed line 228 the current is driven onto the column line for the pixel. The column line (and pixel) has an associated capacitance and thus the voltage gradually rises to a maximum 230. The pixel does not begin to emit light until a point 232 is reached where the voltage across the pixel is greater than the OLED diode voltage drop. Similarly when the drive current is tamed off at time 234 the voltage and light output gradually decay as the column capacitance discharges. Where the pixels in a row are all written simultaneously, that is where the column are driven in parallel, the time interval between times 228 and 234 corresponds to a line scan period.

It is desirable to be able to provide a greyscale-type display, that is one in which the apparent brightness of individual pixels may be varied rather than simply set either on or off. In the context of this invention "greyscale" refers to such a variable brightness display, whether a pixel is white or coloured.

The conventional method of varying pixel brightness is to vary pixel on-time using Pulse Width Modulation (PWM). In the context of FIG. 2b above the apparent pixel brightness may be varied by varying the percentage of the interval between times 228 and 234 for which drive current is applied. In a PWM scheme a pixel is either full on or completely off but the apparent brightness of a pixel varies because of integration within the observers eye.

Pulse Width Modulation schemes provide a good linear brightness response but to overcome effects related to the delayed pixel turn-on they generally employ a precharge current pulse (not shown in FIG. 2b) on the leading edge 236 of the driving current waveform, and sometimes a discharge pulse on the trailing edge 238 of the waveform. As a result, charging (and discharging) the column capacitance can account for half the total power consumption in displays incorporating this type of brightness control. Other significant factors which the applicant has identified as contributing to the power consumption of a display plus driver combination include dissipation within the OLED itself (a function of OLED efficiency), resistive losses in the row and column lines and, importantly in a practical circuit, the effects of a limited current driver compliance, as explained in more detail later.

FIG. 3 shows a schematic diagram 300 of a generic driver circuit for a passive matrix OLED display. The OLED display is indicated by dashed line 302 and comprises a plurality n of row lines 304 each with a corresponding row electrode contact 306 and a plurality m of column lines 308 with a corresponding plurality of column electrode contacts 310. An OLED 312 is connected between each pair of row and column lines with, in the illustrated arrangement, its anode connected to the column line. A y-driver 314 drives the column lines 308 with a constant current and an x-driver 316 drives the row lines 304, selectively connecting the row lines to ground. The y-driver 314 and x-driver 316 are typically both under the control of a processor 318. A power supply 320 provides power to the circuitry and, in particular, to y-driver 314.

Specific examples of OLED display drivers are described in U.S. Pat. Nos. 6,014,119, 6,201,520, 6,332,661, EP 1,079,361A and EP 1,091,339A; OLED display driver integrated circuits are also sold by Clare Micronix of Clare, Inc., Beverly, Mass., USA. The Clare Micronix drivers provide a current controlled drive and achieve greyscaling using a conventional PWM approach.

U.S. Pat. No. 6,014,119 describes a driver circuit in which pulse width modulation is used to control brightness and in which the emitters of driver transistors are connected to a fixed voltage via resistors, the resistors being considered to approximate a substantially ideal current source.

U.S. Pat. No. 6,201,520 describes driver circuitry in which each column driver has a constant current generator associated with a set of switches which allows non selected pixels to be reverse biased to prevent crosstalk. The described circuits provide digital (on/off) pixel control but are not suitable for displays in which the brightness of individual pixels need to be independently adjustable, for example analog, greyscale-type displays.

U.S. Pat. No. 6,332,661 describes pixel driver circuitry in which a reference current generator sets the current output of a constant current driver for a plurality of columns, but again this arrangement is not suitable for analog greyscale type displays.

EP 1,079,361A and EP 1,091,339A both describe similar drivers for organic electroluminescent display elements in which a drive voltage (rather than a drive current) for an organic EL element is set by a microcomputer driving an operational amplifier, negative feedback being applied in an attempt to compensate for characteristic variations and ageing effects associated with voltage drive circuits.

It is generally desirable to reduce the power consumption of the display plus driver combination, especially whilst retaining the ability to provide a greyscale display. It is further desirable to reduce the maximum required power supply voltage for the display plus driver combination.

BRIEF DESCRIPTION OF THE DRAWINGS

FIGS. 2a to 2d show, respectively, a conceptual driver arrangement for a passive matrix OLED display, a graph of current drive against time for a display pixel, a graph of pixel voltage against time, and a graph of pixel light output against time;

DETAILED DESCRIPTION

Figure 1A:
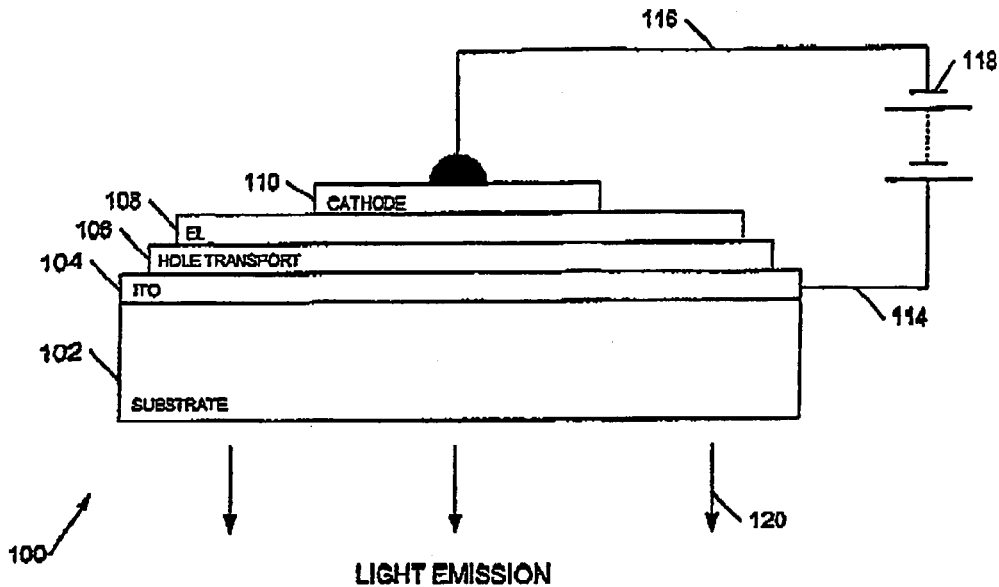
FIGS. 1a and 1b show cross sections through, respectively, an organic light emitting diode and a passive matrix OLED display.
Figure 1B:
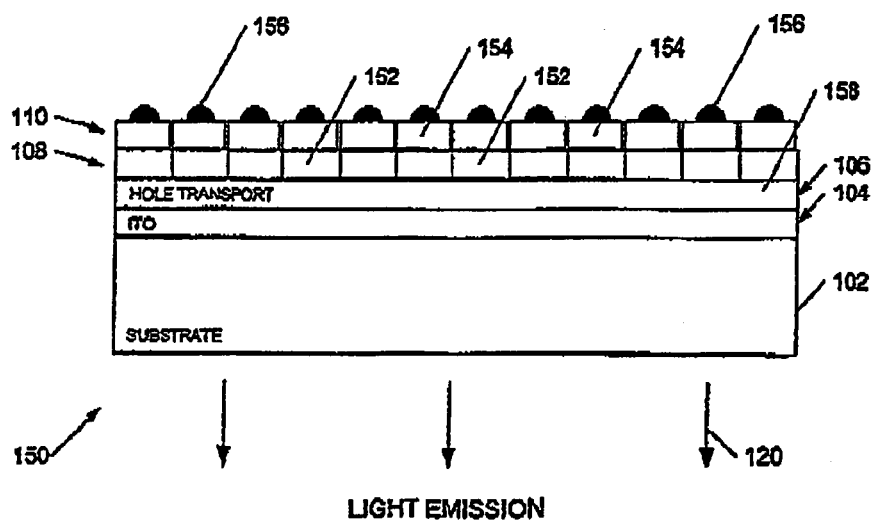

According to the present invention there is therefore provided a display driver for a passive organic electroluminescent display, the display driver comprising a controllable current generator to provide a variable current drive output to the display, the current generator comprising at least one bipolar transistor in series with the current drive output whereby the display brightness is adjustable by controlling the current generator to vary the current drive to the display.

According to the disclosure, a current source attempts to deliver a substantially constant current to the load to which it is connected but it will be appreciated that there will come a point as its voltage approaches the supply voltage, at which this is no longer possible. The range of voltages over which a current source provides an approximately constant current to a load is termed the compliance of the current source. The compliance can be characterised by ($V_s$-$V_o$) where $V_s$ is the supply voltage and $V_o$ is substantially the output voltage of the current source in that when $V_s$-$V_o$ is small the compliance is high, and vice-versa. (For convenience in this specification reference will be made to a current source and to current sources but these may be substituted by a current sinks or sinks).

The lower the current driver compliance (i.e. the greater $V_s$-$V_o$), the greater the power losses due to limited driver compliance. The lower the driver circuit compliance the greater the supply voltage to the current driver must be in order to obtain a maximum desired pixel brightness, as can be seen by an example. Consider an OLED driver in which the pixel brightness is controlled by controlling the drive current $I_{drive}$ rather than by pulse width modulating the OLED. Assume $I_{drive}$ for maximum brightness can be obtained with a voltage across the OLED of approximately 8 volts and consider the two cases, where the current generator requires a supply voltage of 9 volts and where the current generator requires a supply voltage of 12 volts to provide the requited maximum $I_{drive}$. When the OLED is half on the voltage across it will be approximately 4 volts (for the sake of this example, although in practice it will be non linear). It can therefore be seen that the power loss in the two cases ($\Delta V \cdot I_{drive}$) in the two cases is 5 $I_{drive}$ and 8 $I_{drive}$ respectively—in other words almost double the loss for the low compliance (large $V_s$-$V_o$) current generator.

The power losses in the current generator can be substantially reduced by designing a (variable) current generator to have a high compliance, that is to have a low value of $V_s$-$V_o$. This is done by employing a bipolar transistor to improve the compliance of the current generator.

Preferably the display is a passive matrix OLED display and the driver is configured such that the brightnesses of individual pixels in a row or column can be substantially independently adjusted in order to provide a greyscale image. Thus the display driver preferably has a plurality of current generators for simultaneously driving a plurality of either or row or column electrodes so that, for example, all the pixels in a row may be driven simultaneously. This helps increase the frame rate and thus the apparent brightness of the display, as well as reducing flickering.

Preferably the bipolar transistor has an emitter terminal substantially directly connected to a power supply line of the driver. This does not necessarily require that the emitter terminal should be connected to a power supply line or terminal for the driver by the most direct route but rather at there should be no intervening components (apart from the intrinsic resistance of tracks or connections within the driver circuitry) between the emitter and a power supply rail. In this way the power supply voltage can be kept to a minimum necessary to drive the display at its maximum desired brightness. Preferably the voltage drop between the emitter terminal and the power supply line is less than expected statistical variations in $V_{be}$ of the transistor, that is typically less than 100 mV, probably less than 50 mV.

Preferably the controllable current generator comprises a current mirror as this allows $V_o$ to approach, typically to within less than 0.5V of the supply, and sometimes to within 0.1V of the supply. A pair of bipolar transistors need not be provided for each driver circuit (although his may be preferable in some embodiments) as a current mirror circuit may, in effect, be shared by a plurality of driver circuits, for example across a plurality of display column electrodes. A current mirror has a finite output impedance and thus the output current can vary by up to 25% over the output compliance range (broadly because $V_{be}$ varies slightly with collector voltage for a given drive current). This effect can be reduced by employing a Wilson current mirror although the compliance is then degraded.

Preferably the display driver includes control circuitry for the current generator using a different transistor technology, preferably the smaller, lower power MOS (Metal Oxide Semiconductor) technology. In this way the total power consumption of the driver may be further reduced. In a preferred embodiment the control circuitry includes a digital to analogue converter to provide an analog current output to the current generator, for example a variable current output to program the load current provided to the display by a current mirror circuit.

In another aspect the disclosure provides display driver circuitry for an organic electroluminescent display, the display comprising a plurality of organic electroluminescent pixels each pixel being addressed by one of each of a first plurality and a second plurality of driving electrodes, the display driver circuitry comprising power supply connection, a plurality of electrode driver outputs for driving a plurality of said display driving electrodes, a plurality of variable current driver circuits, each having a control input and providing a variable current drive for a said electrode driver output, and each comprising a bipolar current drive transistor having an emitter terminal substantially directly connected to said power supply connection and a collector terminal coupled to a said electrode driver output; and control circuitry coupled to the control inputs of said driver circuits and configured to provide as analog signal to each said control input for controlling the variable current drive provided by each said driver circuit, whereby the brightness of each pixel is adjustable.

Again by providing a variable or analog current drive using a bipolar current drive transistor with an emitter terminal substantially directly connected to a power supply connection or bus for the circuit, that is without intervening components, a power-efficient variable brightness OLED pixel display driver may be provided. It will be appreciated that although the control input signal is analog it may be quantized, for example where the control circuitry is itself controlled by a digital signal.

The collector terminal of the drive transistor is preferably also substantially directly connected to the electrode driver output for driving a display, thus helping to minimise unwanted voltage drops and to increase the overall operating efficiency of the driver plus display combination. The collector terminal may be connected to the load via an intervening component or components (such as another bipolar transistor, for example when using a Wilson current mirror) but this is not preferred because the compliance is reduced.

The display driver circuitry is suitable for either small molecule or polymer LEDs and is especially suitable for providing greyscale images on passive matrix OLED displays, that is displays in which different pixels may need to be set at different brightnesses.

Preferably the current driver circuit comprises a current mirror, preferably two bipolar transistors being provided for each column (or row) of the display. The bipolar current drive transistor may comprise a Darlington transistor or a variant such as a complementary Darlington (also known as a complementary feed-back pair or Sziklai connected pair). Preferably the control circuitry consists of MOS transistors, for a further power saving. In one embodiment the control circuitry comprises a plurality of FET switches each coupled to a respective current setting component for example a current setting resistor.

In a third aspect the disclosure provides a column electrode display driver for a passive OLED display, the display comprising a matrix of OLEDs and a plurality of row and column electrodes, each OLED having an anode coupled to a said column electrode and a cathode coupled to a said row electrode, the display driver comprising a plurality of independently adjustable, high compliance bipolar column current drivers each having an analog input for providing a variable column current drive to the display.

In a further aspect the disclosure provides display driver circuitry for an organic electroluminescent display, the display comprising a plurality of organic electroluminescent pixels each pixel being addressed by one of each of a first plurality and a second plurality of driving electrodes, the display driver circuitry comprising, a power supply connection, a plurality of electrode driver outputs for driving a plurality of said display driving electrodes, a plurality of current driver circuits for each driving electrode for providing a plurality of current drives for a said electrode driver output, each having a control input and each comprising a bipolar current drive transistor having an emitter terminal substantially directly connected to said power supply connection and a collector terminal coupled to a said electrode driver output; and control circuitry coupled to the control inputs of said driver circuits and configured to provide a signal to each said control input for controlling the current drive provided to a said electrode driver output, whereby the brightness of each pixel is adjustable.

The disclosure also provides a corresponding method of increasing the efficiency of a current driver for an organic electroluminescent display, the method comprising, using a bipolar transistor with an emitter terminal substantially directly connected to a power line to provide a current drive for the display; and using a voltage for the power line such that when the organic electroluminescent display is at substantially a maximum desired brightness the bipolar transistor current drive is operating substantially at its limit of compliance.

As described above, excess power dissipation in an OLED current driver can be reduced by employing a bipolar transistor substantially directly connected to a power line of the driver and then by choosing a power supply voltage which is no more than necessary to give the required display brightness when the current drive is operating substantially at its limit of compliance, that is when the output voltage from the current drive is substantially the maximum possible at the selected power supply voltage for the current drive. Preferably the display a variable brightness display and the current drive is a variable current drive as this allows further power savings as compared with conventional PWM brightness control.

Figure 4:
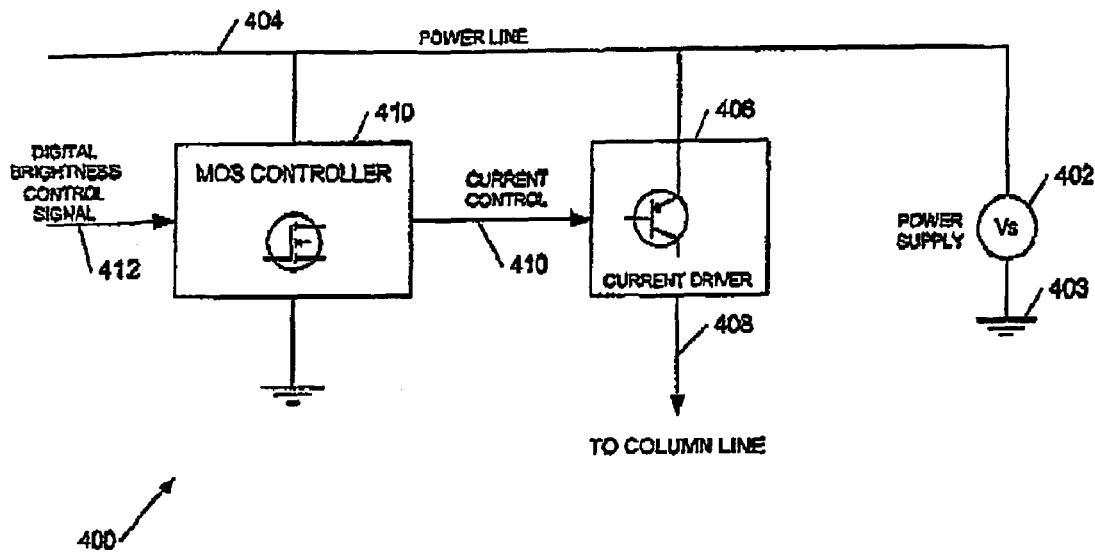
FIG. 4 shows a block diagram of a passive matrix OLED display pixel driver according to an embodiment of the disclosure.

FIG. 4 shows a block diagram of a generic variable current bipolar transistor driver 400 for an organic electroluminescent display. The driver comprises a bipolar current driver portion 406 and a MOS controller portion 410; typically these will both be integrated on a common integrated circuit substrate. A power supply 402, external to the integrated circuit is connected to a power line 404 within the integrated circuit and to a ground connection 403 of the integrated circuit.

The bipolar current driver 406 has a current control input 410 and provides a controlled current output 408 to the display, in the case of a passive matrix display to a column or row line. The current control input 410 allows the current on column line 408 to be varied between minimum and maximum current outputs corresponding to minimum and maximum desired display brightnesses.

The control signal on input 410 is preferably an analog control signal provided from MOS controller 410 in response to a digital brightness control signal 412 provided to the MOS controller 410. Thus preferably the MOS controller 410 comprises a digital to analog converter. It will be appreciated that although the current driver 406 is in principle capable of outputting a continuously variable current, in practice the digital control signal constrains the output current to one of a number of discreet values determined by the number of bits in the digital control signal.

The bipolar current driver 406 is designed to allow the output voltage on line 408 to approach as close as possible to the supply voltage on power line 404, thus giving the driver a high compliance. This is facilitated by directly connecting an emitter terminal of a bipolar current driver transistor (i.e. a transistor in series with the column line connection) substantially directly to power line 404. Preferably the current driver 406 also includes a bipolar transistor driver with a collector terminal directly connected to display drive line 408. This allows the output voltage of the current driver to closely approach the supply voltage, thus increasing the overall power efficiency of the display plus driver combination in operation.

Figure 3:
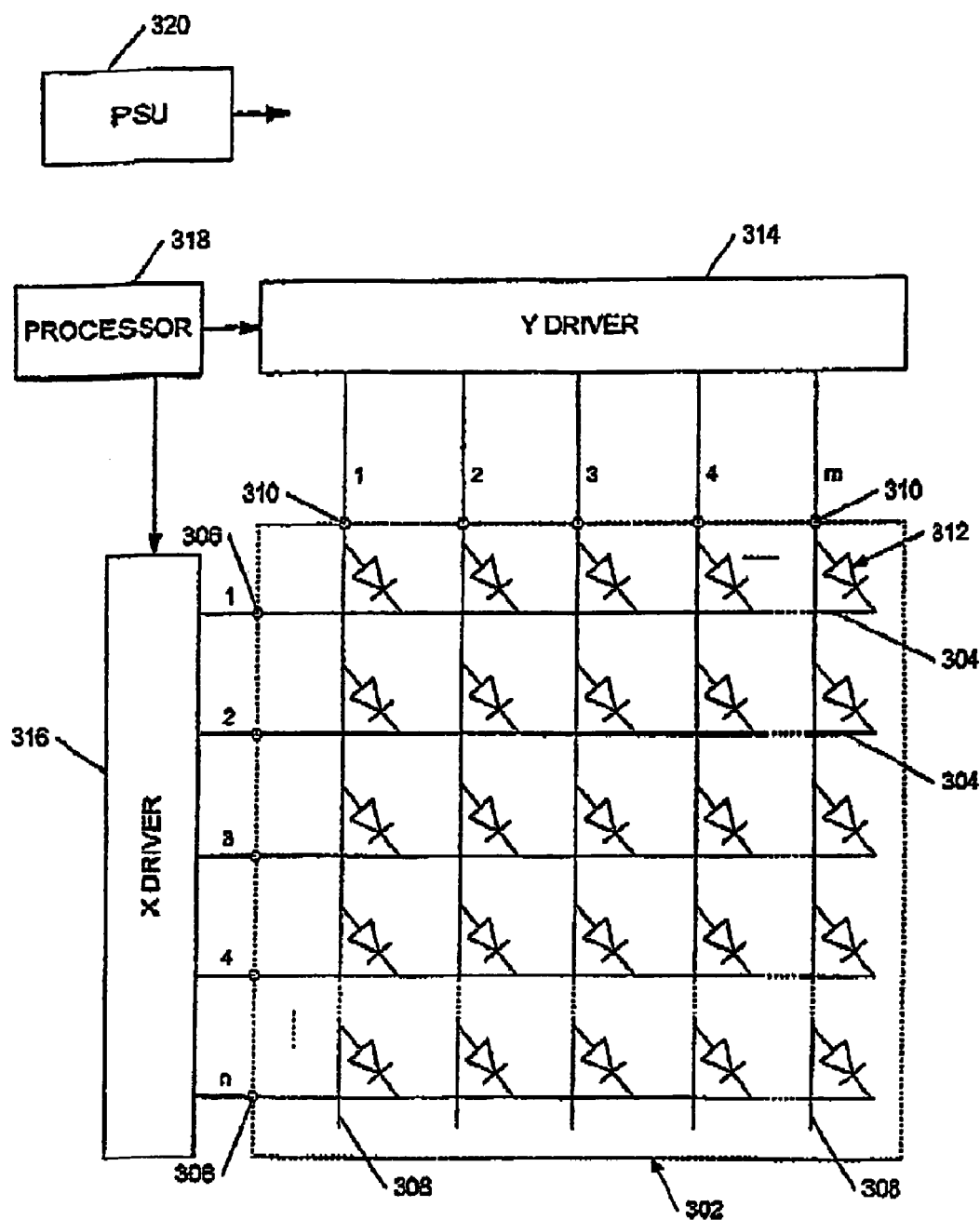
FIG. 3 shows a schematic diagram of a generic driver circuit for a passive matrix OLED display according to the prior art.
Figure 5:
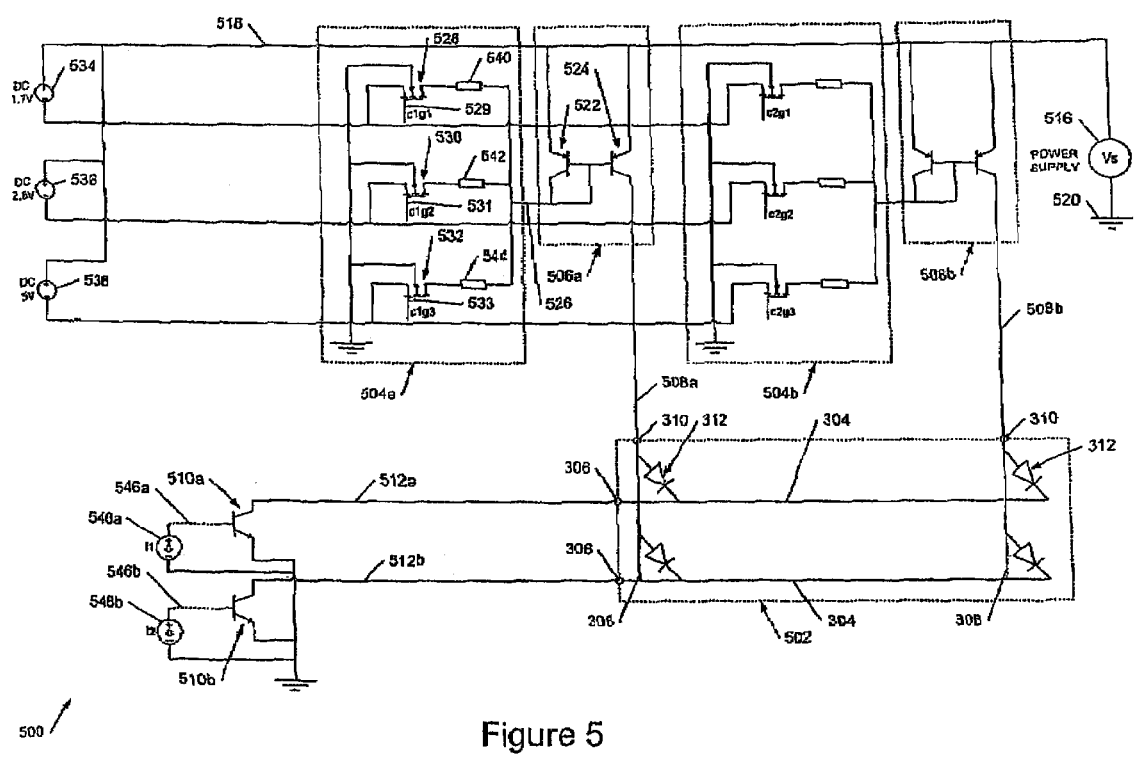
FIG. 5 shows a schematic diagram of a passive matrix OLED display driver circuit according to an embodiment of the disclosure.

Referring now to FIG. 5, this shows a schematic diagram of display driver circuitry for a passive matrix OLED display 502. The display 502 is similar to the display 302 of FIG. 3, although for convenience only four pixels are shown. Like elements of display 502 to those of display 302 have been given like reference numerals.

The driver circuitry comprises a MOS controller 504a, b and a bipolar current driver 506a, b for each column line output 508a, b. Likewise a row line driver 510a, b is provided for each row line connection 512a, b. In practice a driver integrated circuit will have many such row and/or column drivers, and large passive matrix displays may require many such driver integrated circuits. Here, for convenience, only one column line driver 504, 506 and only one row line driver 510 will be described in detail as the others are similar.

The driver circuitry is powered an external power supply 516 connected to power 518 and ground 520 line connections of the driver circuitry. The bipolar current driver 506a comprises a pair of PNP bipolar transistors 522, 524 connected to power line 518 in a current mirror configuration. In such a configuration a current on input line 526 controls a load current on output 508a, the ratio of the two currents being determined by the ratio of the transistor junction areas (for matched transistors).

The MOS controller 504a comprises three FET switches 528, 530, 532 each connected to a respective power supply 534, 536, 538. The gate connections of the transistors 529, 531, 533 comprise a three bit digital input each switching a respective power supply 534, 536, 538 to a corresponding current setting resistor 540, 542, 544. Each of resistors 540, 542, 544 is connected to the current input 526 of the current mirror 506a. Each of the power supplies 534, 536, 538 has a voltage which is approximately twice that of the next lowest power supply (not exactly because of the $V_{be}$, drop) so that a digital value on FET gate connections 529, 531, 533 is converted into a corresponding current on line 526 so that MOS controller 504a converts a digital voltage value to an analogue current. In other embodiments power supplies 534, 536 and 538 may have the same voltage and the value of resistors 540, 542, 544 may be scaled in powers of two. Different voltage and/or resistor values maybe employed according to the application and other design considerations.

Transistor 524 is directly connected between power line 518 and column line output 508a (discounting any track resistance), thus maximising the compliance of the current driver or, in other words, allowing the voltage on column line output 508a to approach as close as possible to that of power line 518. This is in contrast to a conventional current source which employs an emitter resistor to stabilise the current output and, in particular, to compensate for statistical variations in $V_{be}$ on $I_o$ in different transistors, With the design shown the voltage on column line 508a may approach within one volt, 500 mV or even to within 100 mV of power line 518.

Where the site of transistors 522 and 524 is the same the current mirror of driver 506a provides a 1:1 ratio of input current on line 526 to output current on line 508a (where the two transistors are substantially matched to one another). Power can be saved by reducing the current in transistor 522, for example by scaling the current mirror. The currents in lines 526 and 508a are in proportion to the areas of transistors 522 and 524 (for matched transistors) and thus the current in transistor 522 may be reduced by making it smaller, for example 1/10 or less, 1/30 or less, or 1/50 or less of the size of transistor 524. Alternatively the current mirror may be scaled by fabricating a further transistor with its base, emitter, and collector in parallel with transistor 524, for example to give a 1:2 scaling. Preferably the current in transistor 522 is around 10% or less of the current in transistor 524.

The row drive circuitry essentially comprises a single bipolar transistor 510a, b controlled by a voltage (or current) applied to its respective base connection 546a, b. For the sake of illustration the row drivers are shown controlled by current sources 548a, b although in practice they will normally be driven by a processor such as processor 318 of FIG. 3 via a suitable interface. The base current is thus drawn from the (lower voltage) logic supply.

Broadly speaking the row driver transistors 510a, b simply act as switches to connect a selected row line to ground. Again, however, it is preferable that as little voltage as possible is dropped across these transistors, although each must handle a maximum current of $nI_{col}$ where n is the number of columns and $I_{col}$ is the maximum column drive current.

Since transistors 510 are essentially only acting as switches to sink current to ground they can be driven hard, preferably into saturation. Preferably the transistors are also physically large to reduce their resistance and hence increase the overall driver compliance. It is also desirable that the driver circuitry makes efficient use of silicon area and for this reason bipolar transistors are preferred. However MOS transistors could be used instead of bipolar transistors as it is practical to make these large enough to reduce the voltage drop to a practical value when the transistor is on. Typical maximum column current values are between 0.1 mA and 1 mA and thus maximum row currents may be up to 100 mA or more.

Figure 6A:
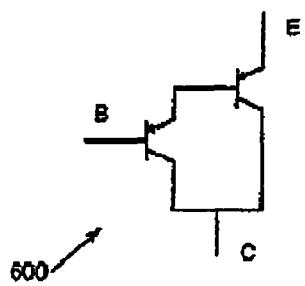
FIGS. 6a to 6c show, respectively, a bipolar Darlington transistor driver, a bipolar complementary Darlington transistor driver, and a bipolar current mirror driver with multiple outputs.
Figure 6B:
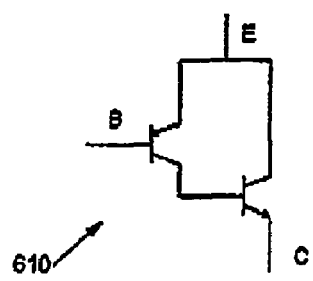

FIG. 6 shows some of the variations which are possible to the circuit of FIG. 5. Thus, for example, bipolar transistor 524 could be replaced by the Darlington transistor configuration 600 of FIG. 6a or alternatively the complementary Darlington (or complementary feedback pair or Sziklai) configuration 610 of FIG. 6b. These configurations provide higher gain thus reducing the base current required but both also introduce an additional diode voltage drop between the emitter and collector and thus reduce the compliance. By increasing the gain of transistor 524 again the current in transistor 522 is reduced thus providing a power saving. For example the current in transistor may be reduced to about 1/30 or 3% of that in transistor 524.

Figure 6C:
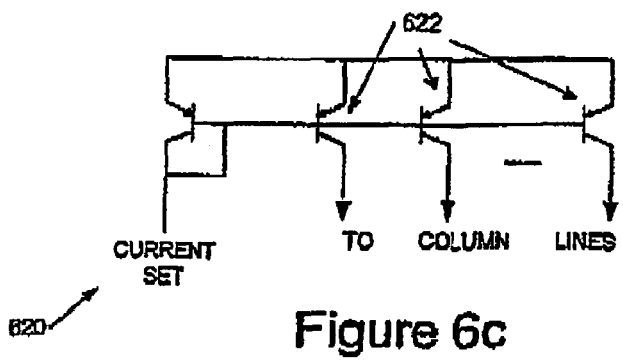

In another alternative configuration as shown in FIG. 6c a current mirror circuit 620 is shared between a plurality of column lines using a multiple-collector transistor 622. If only one such current mirror 620 is employed for a set of column lines the column current for each of the lines must be set in turn where different column currents are needed on the different lines. However the current mirror 620 may be employed in a variant of the circuit of FIG. 5 in which the control circuitry selects one of a predetermined set of currents for the column lines rather than controlling a bipolar current driver on each column line. Thus, for example, where the display provides sixteen different levels of pixel brightness (for bit control) sixteen current mirrors 620 may be provided to supply the sixteen different levels of current to each of the column line outputs of the driver, the control circuitry then selecting an appropriate current. Where there are fewer levels of pixel brightness than columns this approach can simplify the driver circuitry.

In a further variant (not shown) the current mirror may be dispensed with and the base voltage of transistor 524 controlled to control the output current, although it is more difficult to obtain accurate current control with such an arrangement. The skilled person will also appreciate that although the circuit of FIG. 5 uses PNP transistors to provide current sources, the circuit may also be inverted to employ controllable current sink drivers using NPN transistors.

No doubt many other effective alternatives will occur to the skilled person and it should be understood that the disclosure is not limited to the described embodiments but encompasses modifications apparent to those skilled in the art lying within the spirit and scope of the claims appended hereto.

The invention claimed is:

1. A display driver for a passive organic electroluminescent display, the display driver comprising:
   a controllable current generator to provide a variable current drive output to the display, the current generator comprising at least one bipolar transistor in series with the current drive output; and
   control circuitry to control the current generator by a current input,
   whereby the display brightness is adjustable by controlling the current generator to vary the current drive to the display, wherein the at least one bipolar transistor has an emitter terminal directly connected to a power supply line of the driver,
   the control circuitry comprises a plurality of current sources to provide a variable current output to the current generator current input, and
   a first said current source is arranged to be controlled to source a predetermined current and each of said current sources except said first current source is arranged to be controlled to source a predetermined current that is greater than the predetermined current of the next lowest predetermined current of said current sources.

2. A display driver as claimed in claim 1 wherein the passive organic electroluminescent display is a passive matrix display having a plurality of pixels addressed by row and column electrodes, the display driver having a plurality of said current generators for driving a plurality of ones of said row and column electrodes, whereby the brightnesses of said pixels are adjustable to provide a greyscale display.

3. A display driver as claimed in claim 1 wherein the controllable current generator includes a current mirror circuit.

4. A display driver as claimed in claim 1 further comprising control circuitry to control the current generator, the control circuitry comprising at least one MOS transistor.

5. A display driver as claimed in claim 1 wherein the control circuitry includes a digital-to-analogue converter to convert a digital control signal input to an analogue signal for providing said variable current output.

6. Display driver circuitry for an organic electroluminescent display, the display comprising a plurality of organic electroluminescent pixels each pixel being addressed by one of each of a first plurality and a second plurality of driving electrodes, the display driver circuitry comprising:
   a power supply connection;
   a plurality of electrode driver outputs for driving the first plurality of driving electrodes or the second plurality of driving electrodes;
   a plurality of display drivers according to claim 1, wherein each said current generator is a variable current driver circuit, each said driver circuit having a control input and providing a variable current drive for a said electrode driver output, and each said current generator comprising a said bipolar transistor that is a bipolar current drive transistor having an emitter terminal directly connected to said power supply connection and a collector terminal coupled to a said electrode driver output, and control circuitry that comprises said control circuitry of said display drivers and is coupled to the control inputs of said driver circuits and configured to provide an analogue signal to each said control input for controlling the variable current drive provided by each said driver circuit;

whereby the brightness of each pixel is adjustable.

7. Display driver circuitry as claimed in claim 6 wherein each said current driver circuit comprises a current mirror having an output coupled to a said electrode driver output and a current control line coupled to said control input.

8. Display driver circuitry as claimed in claim 6 wherein said bipolar current drive transistor comprises a Darlington transistor pair.

9. Display driver circuitry as claimed in claim 6 wherein said control circuitry comprises MOS transistors.

10. Display driver circuitry as claimed in claim 9 wherein a said current driver control input comprises a current set input wherein the control circuitry for each of said current driver circuits comprises a controllable current setting means coupled to said current set input.

11. Display driver circuitry as claimed in claim 10 wherein the controllable current setting means comprises a plurality of FET switches each coupled to a respective current setting component.

12. Display driver circuitry as claimed in claim 6 wherein said electrode driver outputs are configured for driving electrodes of one of said first and second pluralities of display driving electrodes, and further comprising a plurality of second bipolar transistors for switching current from electrodes of the other of said first and second pluralities of display driving electrodes.

13. Display driver circuitry as claimed in claim 12, further comprising a second power supply connection, and wherein each said second bipolar transistor has an emitter terminal substantially directly connected to said second power supply connection and a collector terminal coupled to a connection for an electrode of the other of said first and second pluralities of display driving electrodes.

14. A column electrode display driver for a passive OLED display, the display comprising a matrix of OLEDs and a plurality of row and column electrodes, each OLED having an anode coupled to a said column electrode and a cathode coupled to a said row electrode, the column electrode display driver comprising a plurality of independently adjustable, high compliance bipolar column current drivers each having an analogue input for providing a variable column current drive to the display, each bipolar column current driver comprising one of a display driver according to claim 1.

15. A column electrode display driver as claimed in claim 14 wherein each said column current driver comprises a bipolar transistor having an emitter directly connected to a power supply connection.

16. A column electrode display driver as claimed in claim 15 further comprising a MOS column current drive controller.

17. A column electrode display driver as claimed in claim 16 wherein each said column current driver comprises a current mirror with a current control connection, and wherein said MOS controller is configured to control a current in the current control connection of each column current driver.

18. Display driver circuitry for an organic electroluminescent display, the display comprising a plurality of organic electroluminescent pixels each pixel being addressed by one of each of a first plurality and a second plurality of driving electrodes, the display driver circuitry comprising:

a power supply connection;

a plurality of electrode driver outputs for driving the first plurality of driving electrodes or the second plurality of driving electrodes;

a plurality of display drivers according to claim 1, said display drivers comprising:

a plurality of current driver circuits for each driving electrode for providing a plurality of current drives for a said electrode driver output, each having a control input and each comprising a bipolar current drive transistor having an emitter terminal directly connected to said power supply connection and a collector terminal coupled to a said electrode driver output; and control circuitry coupled to the control inputs of said driver circuits and configured to provide a signal to each said control input for controlling the current drive provided to a said electrode driver output;

whereby the brightness of each pixel is adjustable.

19. A display driver as claimed in claim 1, wherein the control circuitry comprises a plurality of switches each connected to a respective power supply, and a plurality of resistors connected to the current input, wherein each switch switches a respective power supply to a respective resistor to provide the variable current output to the current generator current input.

20. A display driver as claimed in claim 1 wherein each said control circuitry comprises a plurality of switches each connected to a respective voltage source, and a plurality of current setting components connected to the current input, wherein each switch switches a respective voltage source to a respective current setting component to provide the variable current output to the current generator current input.

21. A display driver as claimed in claim 20 wherein the switches are FET switches with a digital value on the FET gate connections being converted into a corresponding analogue current.

22. A display driver as claimed in claim 20 wherein a first said voltage source has a predetermined voltage and each of said voltage sources except said first voltage source has a voltage that is substantially a predetermined multiple of the next lowest said voltage source.

23. A display driver as claimed in claim 22, wherein each said respective voltage source is a power supply, and each said current setting component is a resistor.

24. A display driver as claimed in claim 20 wherein each said current setting component is a resistor, a first said resistor has a predetermined resistance and each of said resistors except said first resistor has a resistance that is substantially a predetermined multiple of the next lowest said resistance.

25. A display driver as claimed in claim 24 wherein values of each of the resistors are scaled in powers of two.

26. A display driver as claimed in claim 24, wherein each said respective voltage source is a power supply, and each said current setting component is a resistor.

27. A display driver as claimed in claim 20, wherein each said respective voltage source is a power supply, and each said current setting component is a resistor.

28. A display driver as claimed in claim 27 wherein each of the plurality of power supplies has a voltage which is approximately twice that of the next lowest power supply.

29. A method of increasing the efficiency of a current driver for an organic electroluminescent display, the method comprising:

using a controllable current generator comprising a bipolar transistor with an emitter terminal directly connected to a power line to provide a current drive for the display;

using a voltage for the power line such that when the organic electroluminescent display is at substantially a maximum desired brightness the bipolar transistor current drive is operating substantially at its limit of compliance;

using a current input to control the current generator;

using a plurality of switchable current sources connected to the current input to provide variable current output to the current generator current input; and using a first said current source to be switchable to source a predetermined current and using each said current source except said first current source to be switchable to source a predetermined current that is greater than the predetermined current of the next lowest predetermined current of said current sources.

30. A method as claimed in claim 29 wherein the organic electroluminescent display is a variable brightness display and said current drive is a variable current drive.

* * * * *

UNITED STATES PATENT AND TRADEMARK OFFICE
CERTIFICATE OF CORRECTION

PATENT NO. : 7,535,441 B2  Page 1 of 1
APPLICATION NO. : 10/507817
DATED : May 19, 2009
INVENTOR(S) : Euan C. Smith et al.

It is certified that error appears in the above-identified patent and that said Letters Patent is hereby corrected as shown below:

Title Page:

Item (74), "Gernstein" should be -- Gerstein --

In the Specification:

At Column 3, line 12, "observers" should be -- observer's --

Signed and Sealed this

Sixteenth Day of February, 2010

David J. Kappos
*Director of the United States Patent and Trademark Office*